United States Patent Office 3,465,803
Patented Sept. 9, 1969

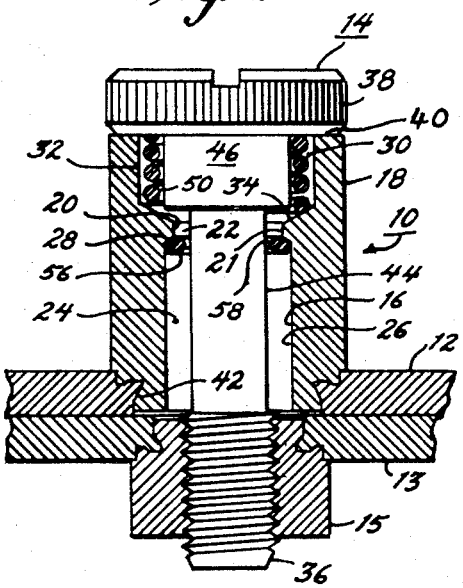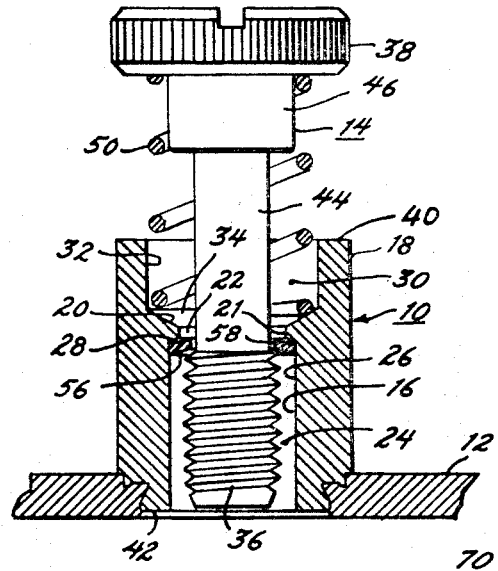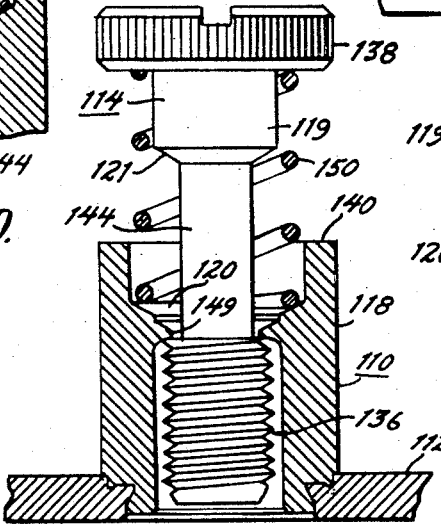
Fig.1. Fig.2. Fig.6. Fig.9. Fig.10. Fig.11.
INVENTORS.
RICHARD B. ERNEST
KENNETH A. SWANSTROM
BY Denny and Denny
THEIR ATTORNEYS.

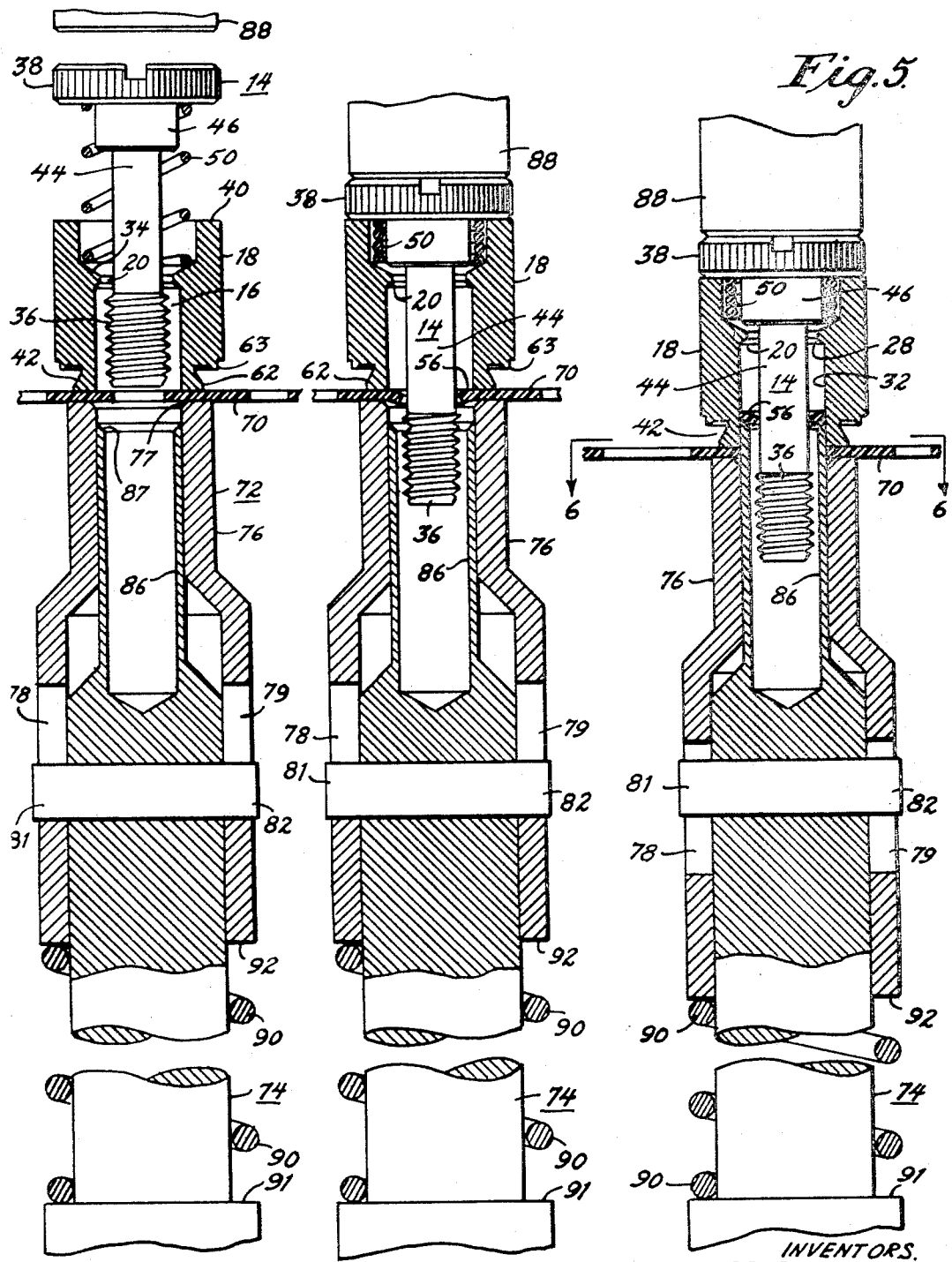

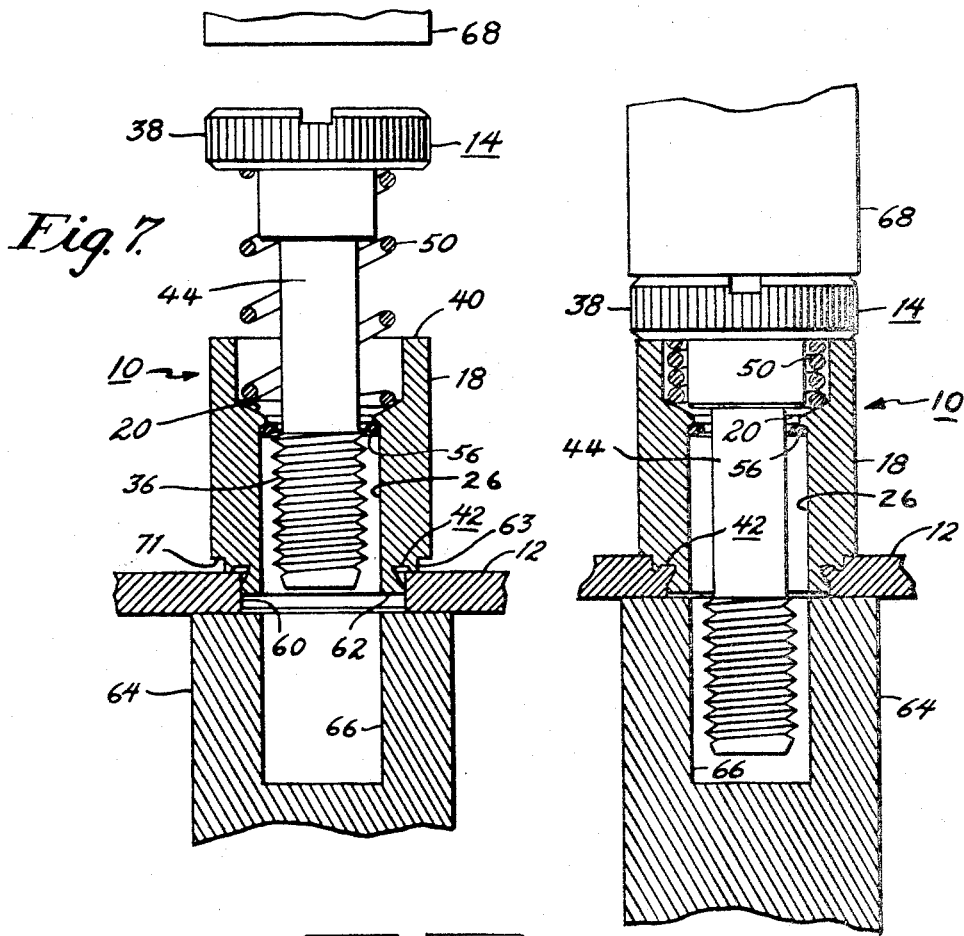
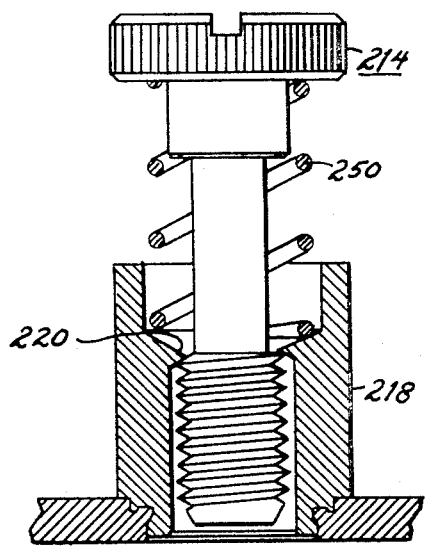

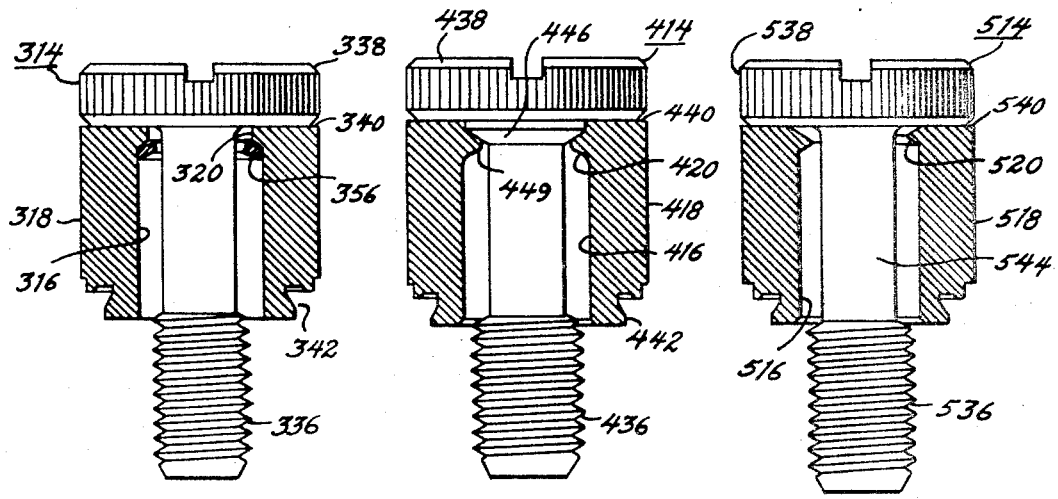

3,465,803
CAPTIVE SCREW DEVICE AND A METHOD FOR SECURING TOGETHER THE PARTS THEREOF
Richard B. Ernest, Richboro, and Kenneth A. Swanstrom, Doylestown, Pa., assignors to Penn Engineering & Manufacturing Corp., Doylestown, Pa., a corporation of Delaware
Filed July 26, 1967, Ser. No. 656,239
Int. Cl. F16b *41/00, 39/22*
U.S. Cl. 151—69        2 Claims

ABSTRACT OF THE DISCLOSURE

A captive screw fastener is provided having a screw which is restrained from being fully withdrawn by a locking element trapped between an abutment carried by the fastener's retainer and the threaded part of the screw. Also, a force is applied to the screw which in turn transfers the force to the retainer to clinch the retainer to a plate.

Background of the invention

This invention concerns captive screw fasteners constructed so that an assembled captive screw fastener may be clinched to a plate while remaining assembled.

Captive screw fasteners are known which comprises a retainer adapted to be secured to a plate, a screw inserted in the retainer, and a means for preventing full retraction of the screw after the retainer has been secured to the plate and the screw inserted. But so far as is known, the captive screw fasteners have not been secured to a plate while in their assembled form. Instead, usually the retainer is, by itself, first secured to the plate and then the screw, and spring, if any, are added.

Brief summary of the invention

An object of this invention is to provide a captive screw fastener which may be secured to a plate while the fastener is assembled.

It is another object of this invention to provide a screw and a retainer so arranged relative to one another that when a force is applied to the screw, the retainer is clinched to a plate.

It is a further object of this invention to provide a locking element cooperating with the retainer and the screw to prevent full withdrawal of the screw relative to the retainer.

The captive screw fastener comprises a retainer having a hole and a screw extending into said hole. A first means is provided to limit the forward movement of the screw and a second means is provided to limit the rearward movement of the screw. The retainer has a clinch means at its forward end portion and the first means cooperates with the retainer to clinch the retainer to a plate.

The captive screw fastener is secured to a plate by placing the plate upon an anvil, engaging the screw with a punch to forcefully move the screw toward the retainer and the anvil until the screw engages the retainer at which time the force exerted by the punch on the screw is transferred by the screw to the retainer to thereby secure the undercut portion of the retainer to the plate.

The foregoing and other objects of this invention, the principles of the invention, and the best modes in which it is contemplated applying such principles will more fully appear from the following description and accompanying drawings in illustration therefore.

Brief description of the views

In the drawings,

FIG. 1 is a cross sectional view of a captive screw fastener constructed in accordance with this invention showing the captive screw fastener clinched to a plate and threaded into a nut carried by another plate;

FIG. 2 is a longitudinal, cross sectional view showing the screw in the retracted position;

FIGS. 3, 4, and 5 illustrate the method for inserting a plastic ring in the retainer;

FIG. 6 is a top view of the plastic strip from which the ring is cut, the view being taken along the line 6—6 in FIG. 5, showing the anvil and shearing punch in dotted lines;

FIGS. 7 and 8 illustrate the method of clinching the captive screw fastener to a plate;

FIG. 9 is a longitudinal, cross sectional view similar to FIG. 2, but showing a modification of the present invention;

FIGS. 10 and 11 are partial cross sectional views of the embodiment illustrated in FIG. 9 and show the flange carried by the retainer before and after it is deformed so as to prevent the full retraction of the screw;

FIG. 12 is a longitudinal, cross sectional view similar to FIG. 9, but illustrating a further modification in which a thread is carried by the retainer so that the screw may be fully withdrawn by unthreading it through the retainer; and FIGS. 13, 14, and 15 are views similar to FIGS. 2, 9, and 12, respectively, but illustrating further modifications.

Detailed description

Referring to the drawings, and in particular to FIG. 1 and 2, a captive screw type device or fastener 10 is illustrated secured to a plate 12, usually a thin, sheet metal plate.

The captive screw fastener 10 comprises a screw 14 extending through a hole 16 formed generally centrally in a retainer 18, the screw 14 and the retainer 18 being generally cylindrical, and the hole 16 being generally circular.

As shown in FIG. 1, the fastener may be used to secure together the plates 12 and 13, the plate 13 carrying a nut 15 clinched to it.

The hole 16 extends completely through the retainer 18, as shown, but the retainer 18 includes an inwardly projecting annular flange 20, having a cylindrical surface 21 defining at the flange a coaxial hole portion 22 of smallest diameter. Below the flange 20, as viewed in FIGS. 1 and 2, the hole is enlarged, as shown, to form a lower, coaxial hole 24 of larger diameter which is defined by a cylindrical surface 26, the latter being connected to the flange surface 21 by a tapered surface 28. Above the flange 20, the hole is further enlarged to its largest diameter and forms an upper, coaxial hole 30 defined by a cylindrical surface 32 and connected to the flange surface 21 by a tapered surface 34.

The screw 14 has a lower or forward part 36 which is threaded and a head 38 at its upper or rear part. The head 38 overhangs the upper or rear surface 40 of the retainer 18, as shown, to limit forward movement of the screw 14 and for use in securing the undercut, lower or forward, part 42 of the retainer 18 to the palte 12, as hereinafter further described.

Between the screw head 38 and the threaded screw part 36, the screw 14 is formed with a neck 44 of smaller diameter than the outside diameter of the threaded screw part 36 and depending on the method of manufacture of the screw 14, the diameter of the neck 14 may or may not be smaller than the root diameter of the threaded screw part 36. The neck 44 extends from the threaded screw part 36 up to a collar 46, the collar 46 extending between the neck 44 and the head 38.

Seated upon the upper tapered surface 34 and coiled about the screw 14 is a compression spring 50 which at its upper end abuts the underside of the head 38, as shown, and biases the head upwardly at all times. The diameter of the collar 46 and the inner diameter of the spring 50 are such that they make a loose, slip fit, but generally tend to centrally align the screw 14 relative to the hole 16 in the retainer 18. Likewise, the outer diameter of the spring 50, relative to the diameter of the surface 32, is such that a loose, slip fit is provided therebetween, while keeping the screw 14 generally, centrally aligned in the hole 16.

Disposed between the threaded part of the screw 14 and the flange 20 is a locking element 56, preferably of ring shape, and of plastic material, such as nylon.

The locking element 56 has a central hole 58 which makes a loose fit with the screw neck 44, but the outer circular surface of the locking element, however, makes a tight fit with the cylindrical surface 26.

FIGS. 7 and 8 illustrate the method of attaching the captive screw fastener 10 to the plate 12. The plate 12 is provided with a bore 60 which receives the pilot 62, the clinching ring 63, whose outer surface is serrated, resting upon the plate 12. The plate 12, in turn, rests upon an anvil 64 having a suitable hole 66 to receive the forward part of the screw 14, as shown in FIG. 8. When the captive screw fastener 10 is initially placed on the plate 12, FIG. 7, the spring 50 maintains the screw retracted, the obstruction provided by the locking element 56 between the flange 20 and the threaded screw part 36 preventing full withdrawal of the screw 14 from the retainer 18.

To clinch the retainer 18 to the plate 12, a punch 68 engages the top surface of the head 38, compresses the spring 50, and brings the undersurface of the head into contact with the platform or rear surface 40 of the retainer. Continued application of force by the punch 68 causes the clinching ring 63 to deform the part of the plate 12 about the hole 60 and thereby clinch the undercut part 42 of the retainer 18 to the plate 12, deforming the plate 12 as shown in FIG. 8, until the shoulder 71 is brought into engagement with the top surface of the plate 12, at which time the forward part of the screw 14 is received in the hole 66 in the anvil, but the locking element 56 remains at the top of the hole 24, because of its tight fit with the surface 26 and its loose fit with the neck 44.

Thereafter, when the punch 68 is raised, the spring 50 retracts the screw 14 so that when the punch 68 is out of contact with the head 38, the screw 14 has returned to the position shown in FIG. 2.

Referring to FIGS. 3, 4, and 5, these figures illustrate a method and apparatus for inserting the locking element 56 into the retainer 18.

To assemble the fastener, the coil spring 50 is placed about the screw 14 and the combination is then slipped into the retainer 18. As shown in FIG. 3, the thus arranged parts are then placed over a strip 70 of plastic material, preferably nylon, being aligned coaxially with the hole in the strip 70 and the support assembly 72 by a suitable guide means (not shown).

The support assembly 72 comprises a suitably supported stationary shearing punch 74, and an annular anvil 76 surrounding the punch 74. The anvil 76 has radially opposed, vertical slots 78 and 79 through which extend the ends 81 and 82 of a horizontal pin carried by the punch 74. The punch 74 has an upper annular, hollow shape and forms an elongated sleeve-like shearing punch 86, preferably of ring shape in cross section, the outer cylindrical surface of which makes a sliding fit with the cylindrical surface 32, as shown in FIG. 5, and whose inner diameter is larger than the outer diameter of the threaded screw part 36.

A movable punch 88, disposed above the screw head 38, is then advanced, engaging the head 38 and moving the screw 14 downwardly, pushing the threaded screw part 36 through the hole in the strip 70. Since the diameter of the hole is smaller than the outer diameter of the threads, the strip tends to stretch to the dished shape shown in FIG. 4, and the hole tends to expand, but because the plastic material is resilient it snaps back behind the threaded screw part 36, i.e., it tends to return to its initial hole size, after the threaded screw part 36 passes entirely through the strip 70, at which time it makes a loose fit with the screw neck 44.

The anvil 76 is biased upwardly by a compression coil spring 90 seated on a shoulder 91 formed by the stationary punch and bearing against the bottom surface 92 of the anvil, as shown. The spring 90 exerts an upward force on the anvil 76 which is greater than the downward force imposed on the strip 70 (and the anvil 76) by the screw threaded part 36 when the latter passes through the hole in the strip 70, FIG. 4, so that the anvil 76 remains stationary at such time. To facilitate the bending of the plastic strip 70 as the threaded screw part 36 passes through it, the inner surface of the anvil 76 is chamfered, as shown at 77 see FIG. 3, punch 86 being chamfered at 87 to aid the shearing action.

Continued downward movement of the punch 88 causes the underside of the screw head 38 to engage the upper surface of the retainer 18, as shown in FIG. 4, the punch force being great enough to overcome the resistance of the spring 90, and cause the anvil 76 to slide down which compresses the spring 90, at which time the retainer 18 and the screw 14 move down from the position of FIG. 4 to that shown in FIG. 5. The stationary hollow punch 86 now shears a ring of plastic material which is pushed into the retainer 18, by the punch 86, to the position shown in FIG. 5. The hole formed by the cylindrical wall 26 and the lower, horizontal surface of the retainer 18 forms a sharp edge acting as a die to facilitate the shearing of the plastic ring 56.

The upper punch 88 then retracts to the position shown in FIG. 3, at which time the upward bias of the coil spring 50 partially retracts the screw. In retracting, the threaded screw part 36 lifts the locking element 56 into engagement with the flange 20, the position shown in FIGS. 2 and 7, inverts the dished shape thereof from that shown in FIG. 5 to that shown in FIG. 2, the full withdrawal of the screw 14 now being prevented by the locking element 56 which is trapped between the flange 20 and the threaded screw part 36. As the movable punch 88 moves from the position of FIG. 5 to that of FIG. 3, the anvil 76 returns, under the bias of the spring 90, to the position shown in FIG. 3, lifting the plastic strip 70 and the fastener 10 to the position shown in FIG. 3. The now assembled fastener 10 comprising the screw 14, the spring 50, the locking element 56, and the retainer 18, is now removed and the strip 70 advances, by suitable means, not shown, so as to be ready for the next assembly operation.

Referring to FIGS. 9, 10, and 11, another embodiment of this invention is illustrated. The captive screw fastener 110 illustrated in FIG. 9 is generally similar to that illustrated in FIG. 2, except that no separate locking element is used. Instead, the screw 114 is provided with a collar 119 which has a tapered shoulder 121, spaced from the head 138, the collar 119 being long enough so that when the head 138 of the screw 114 is initially seated on the top surface 140 of the retainer 118, the shoulder 121 will impinge upon the upper tapered surface 134 of the flange 120 and deform it inwardly and downwardly to a diameter smaller than the outside diameter of the threaded screw part 136 but larger than the diameter of the neck 144, forming a coined peripheral surface 149 which prevents the full withdrawal of the screw from the retainer, as shown in FIG. 9.

FIG. 10 illustrates the screw 114, in part, just before the shoulder 121 is forcefully brought into engagement with the flange 120, the flange 120 being made initially with a diameter sufficient to permit insertion of the threaded screw part 136 below the flange 120. FIG. 11 is a fragmentary view of the screw 114, the spring 150, and the retainer 118, illustrating the initial contact between the shoulder 121 and the flange 120, further downward movement being limited by engagement of the head 138 with the upper surface of the retainer 118. This deformation of the flange 120 may be accomplished when the fastener is assembled to a plate 112 or previously thereto.

FIG. 12 illustrates a further embodiment generally similar to the embodiment shown in FIGS. 9 to 11, inclusive. However, in the embodiment shown by FIG. 12 the cylindrical retainer 218 is provided with a single thread 220, instead of the flange 20 (illustrated in FIG. 2) and the flange 120 (illustrated in FIG. 9). The cylindrical screw 214 is inserted into the retainer 218 by threading it past the single thread 220 and it can thereafter be moved longitudinal downward against the pressure of the coil spring 250 until the head strikes the retainer 218. The coil spring 250 biases the screw 214 upwardly, to the position shown in FIG. 12, and the thread 220 provides an abutment preventing the full retraction of the screw 214, unless it is unthreaded through the single thread 220.

Referring to FIGS. 13, 14, and 15 additional embodiments of the invention are illustrated in which the coil spring is omitted and the retainer is correspondingly shortened.

Referring to FIG. 13 a cylindrical retainer 318 is illustrated having a central hole 316, a forward clinching portion 342, and a rear platform 340. The platform 340 extends radially inwardly to form a flange 320, the flange 320 defining the smallest part of the central hole 316. Disposed between the flange 320 and the threaded screw portion 336 is a locking element 356 similar to the locking element 56 illustrated and described in connection with FIGS. 1 to 8. The screw 314 has a head 338 of approximately the same diameter as the outside diameter of the retainer 318 and overlies the platform 340, as illustrated in FIG. 13.

In FIG. 14, the cylindrical retainer 418 also has an undercut forward portion 442, an upper platform 440, and a central hole 416. The platform 440 extends inwardly, as shown, to form a flange 420 which is coined by the shoulder 446 to form a peripheral abutment 449 having an inner diameter less than the outer diameter of the threaded screw part 436, so that full retraction of the screw from the retainer is prevented by engagement by the threaded screw part 436 therewith. Forward movement of the screw 414 is limited, as previously, by engagement of the head 438 with the platform 440.

In the embodiment shown in FIG. 15, the general arrangement is similar to that previously described in connection with FIGS. 13 and 14, except that the platform 540 extends inwardly in the shape of a single thread 520 which mates with the threaded screw part 536 of the screw 514. Hence, the screw is assembled to the retainer 518 by threading the screw part 536 through the single thread 520 into the central hole 516 and thereafter, by virtue of the neck 544, the screw may be moved longitudinally until its movement is stopped by engagement of the head 538 with the platform 540. Longitudinal movement in the opposite direction is limited by engagement of the screw threads 536 with the single thread 520. Of course, in the embodiment shown by FIG. 15, the screw 514 may be fully retracted from the retainer 518 by unthreading it past the single thread 520.

While in the various embodiments the head of the screw has been shown with a diameter approximately equal to the outside diameter of the retainer, it is understood that the size of the head may be larger or smaller so long as it overlies the rear portion of the retainer a sufficient amount so as to effectuate clinching of the retainer to the plate. Also, while the outer surface of the head has been shown as knurled and the head has been shown provided with a slot to receive a suitable tool, it will be seen that other suitable configurations of the head could be provided, as desired.

Further, while the plate 13, in FIG. 1, has been illustrated as carrying a clinched nut 15 it will be understood that the fastener secured to the plate 13 may be of various types, such as a floating nut fastener, or threads may be provided directly in the plate 13, as desired.

Having described this invention, what we claim is:

1. A captive screw type fastener comprising a retainer having first and second end portions and an axial bore therethrough, said retainer having an annular flange projecting inwardly intermediate said first and second end portions of said retainer, said bore being defined by a first diameter section extending through said first end portion and a second, larger diameter section extending through said second end portion, said bore including a section extending through said flange of smaller diameter than the section of the bore in the first end portion, said flange including a shoulder on the side facing said first end portion and a tapered seat on the side facing said second end portion, a screw extending into said bore, said screw having a threaded part at one end portion and a collar and a head at the opposite end portion, said screw having a neck between its threaded part and its collar, said neck being smaller in diameter than said threaded part and said collar, and a threadable annular locking element frictionally held tightly within the first end portion of said retainer, said locking element being captured along said neck, said locking element being wide enough to be restricted from escaping from said fastener by said shoulder on one side and by said threaded part of said screw on the other side, a compression spring coiled about said screw and seated at one end on said tapered seat and at the other end against said head tending to centrally locate said screw relative to said retainer, the first end portion of said retainer having a forward, undercut portion to be clinched to a plate, and said head overlapping the second end portion of said retainer and being abuttable therewith for applying a sufficient force to said retainer to clinch said retainer to said plate.

2. The structure recited in claim 1 wherein said locking element is of plastic material.

References Cited

UNITED STATES PATENTS

| 748,078 | 12/1903 | Kaisling | 151—69 |
|---|---|---|---|
| 1,251,676 | 1/1918 | McCaffray. | |
| 2,987,811 | 6/1961 | Acres | 151—69 |
| 3,137,336 | 6/1964 | Wing | 151—41.73 |
| 3,204,680 | 9/1965 | Barry | 151—69 |
| 3,209,807 | 10/1965 | Rymer | 151—69 |
| 3,244,212 | 4/1966 | Barry | 151—69 |
| 3,250,559 | 5/1966 | Sommerfeld | 151—69 |
| 3,343,581 | 9/1967 | Martin et al. | 151—69 |

FOREIGN PATENTS

| 157,520 | 7/1954 | Australia. |
| 590,864 | 1/1960 | Canada. |
| 125,200 | 4/1919 | Great Britain. |
| 161,489 | 12/1953 | Sweden. |

MARION PARSONS, JR., Primary Examiner

U.S. Cl. X.R.

151—41.73